Figure 1:
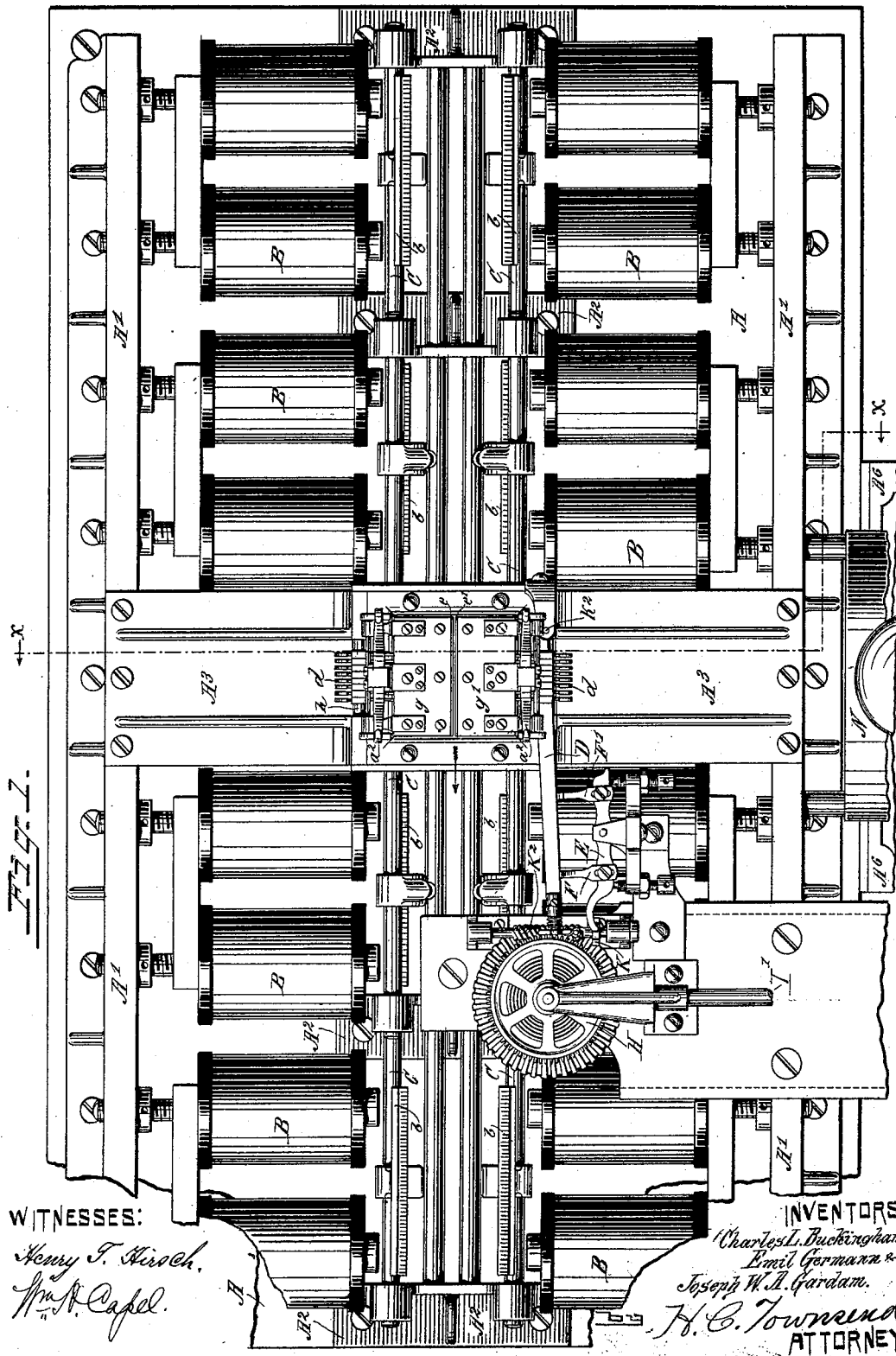

(No Model.) 9 Sheets—Sheet 1.

C. L. BUCKINGHAM, E. GERMANN & J. W. A. GARDAM.
PERFORATOR.

No. 568,512. Patented Sept. 29, 1896.

WITNESSES:
Henry T. Hirsch.
Wm N. Capel.

INVENTORS:
Charles L. Buckingham,
Emil Germann &
Joseph W. A. Gardam.
H. C. Townsend
ATTORNEY.

(No Model.) 9 Sheets—Sheet 2.
C. L. BUCKINGHAM, E. GERMANN & J. W. A. GARDAM.
PERFORATOR.

No. 568,512. Patented Sept. 29, 1896.

WITNESSES:
Henry T. Hirsch
Wm. P. Capel

INVENTORS:
Charles L. Buckingham,
Emil Germann &
Joseph W. A. Gardam.
H. C. Townsend
ATTORNEY.

(No Model.) 9 Sheets—Sheet 4.
C. L. BUCKINGHAM, E. GERMANN & J. W. A. GARDAM.
PERFORATOR.
No. 568,512. Patented Sept. 29, 1896.
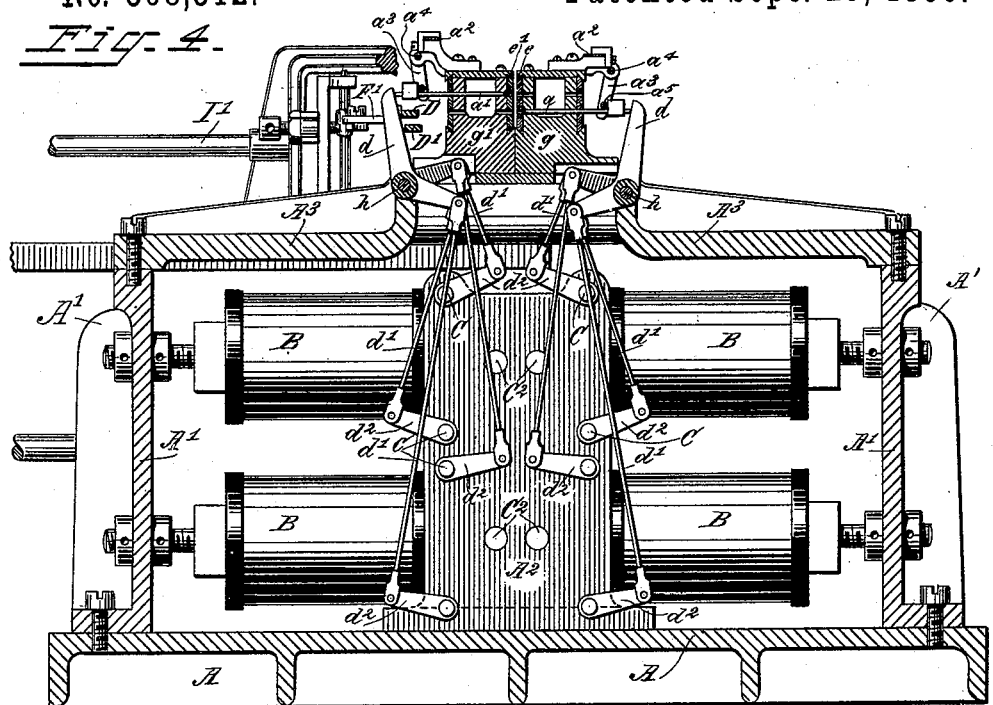
Fig. 4.
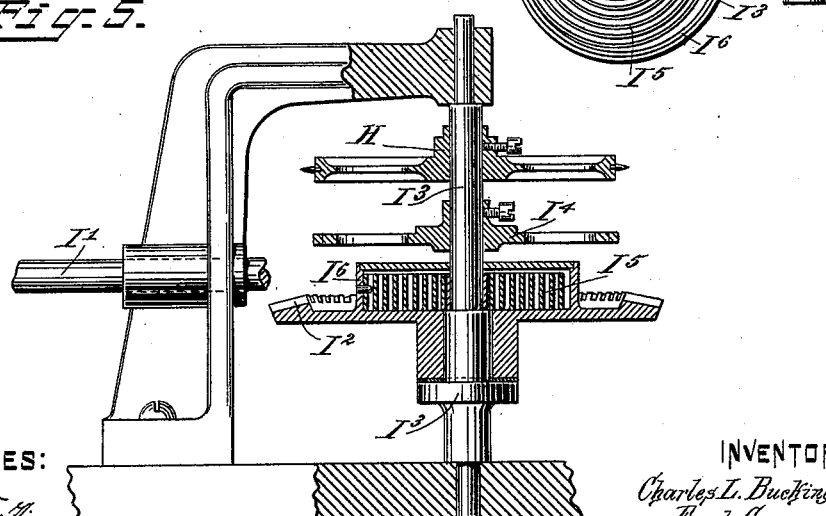
Fig. 6.
Fig. 5.
WITNESSES:
Henry T. Kirsch.
Wm. H. Capel.
INVENTORS:
Charles L. Buckingham,
Emil Germann &
Joseph W. A. Gardam.
By H. C. Townsend
ATTORNEY.

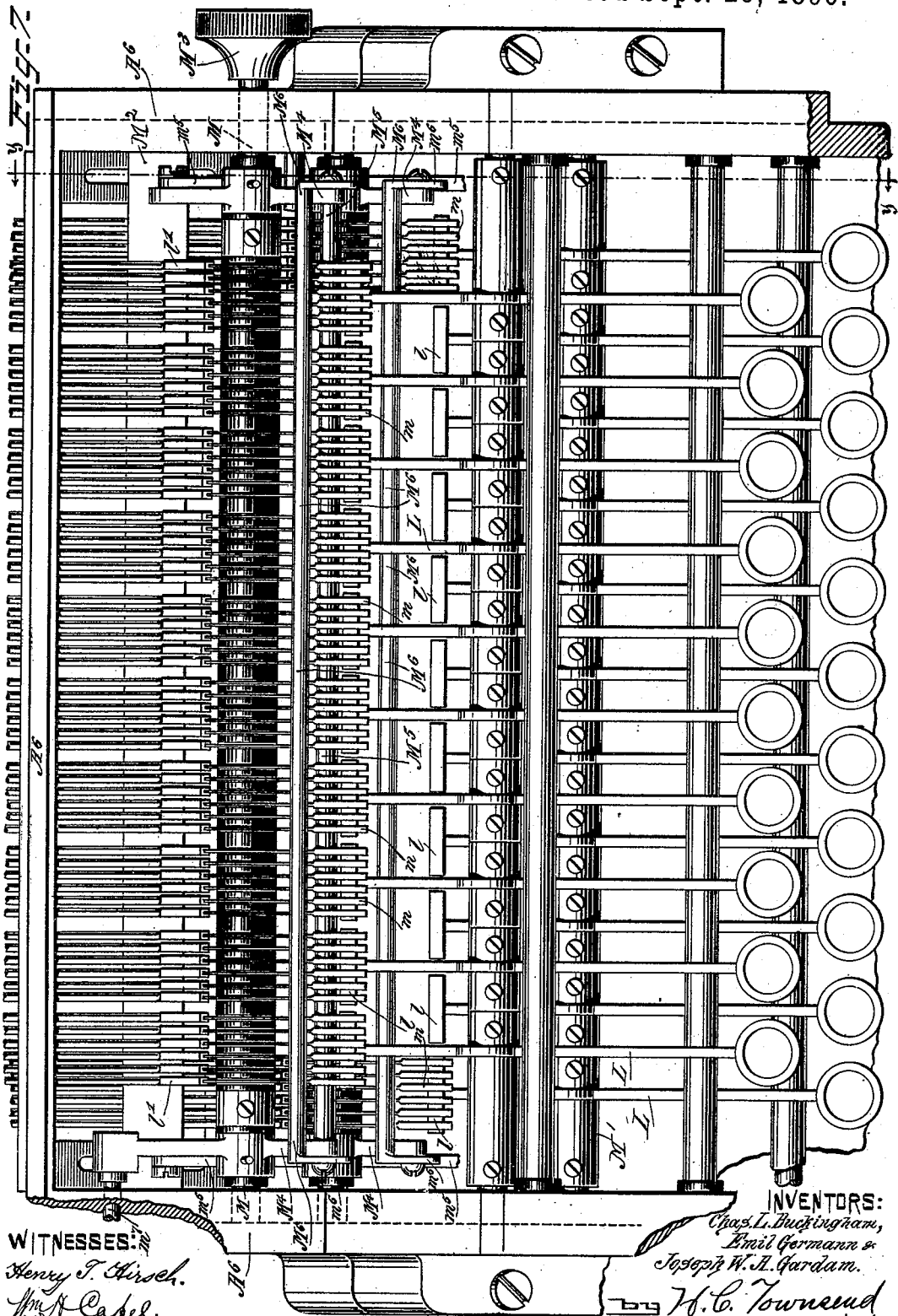

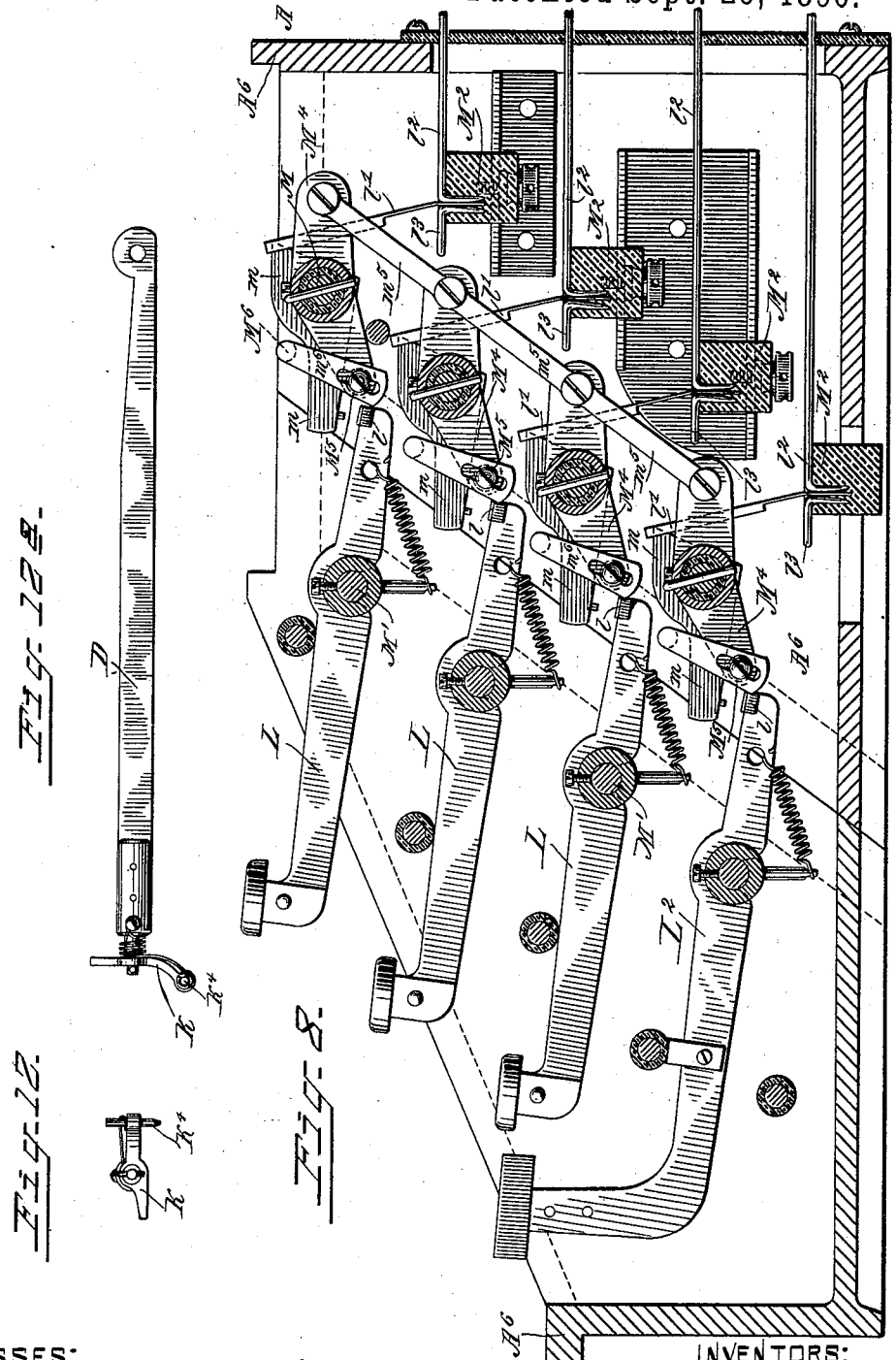

(No Model.) 9 Sheets—Sheet 7.
C. L. BUCKINGHAM, E. GERMANN & J. W. A. GARDAM.
PERFORATOR.
No. 568,512. Patented Sept. 29, 1896.
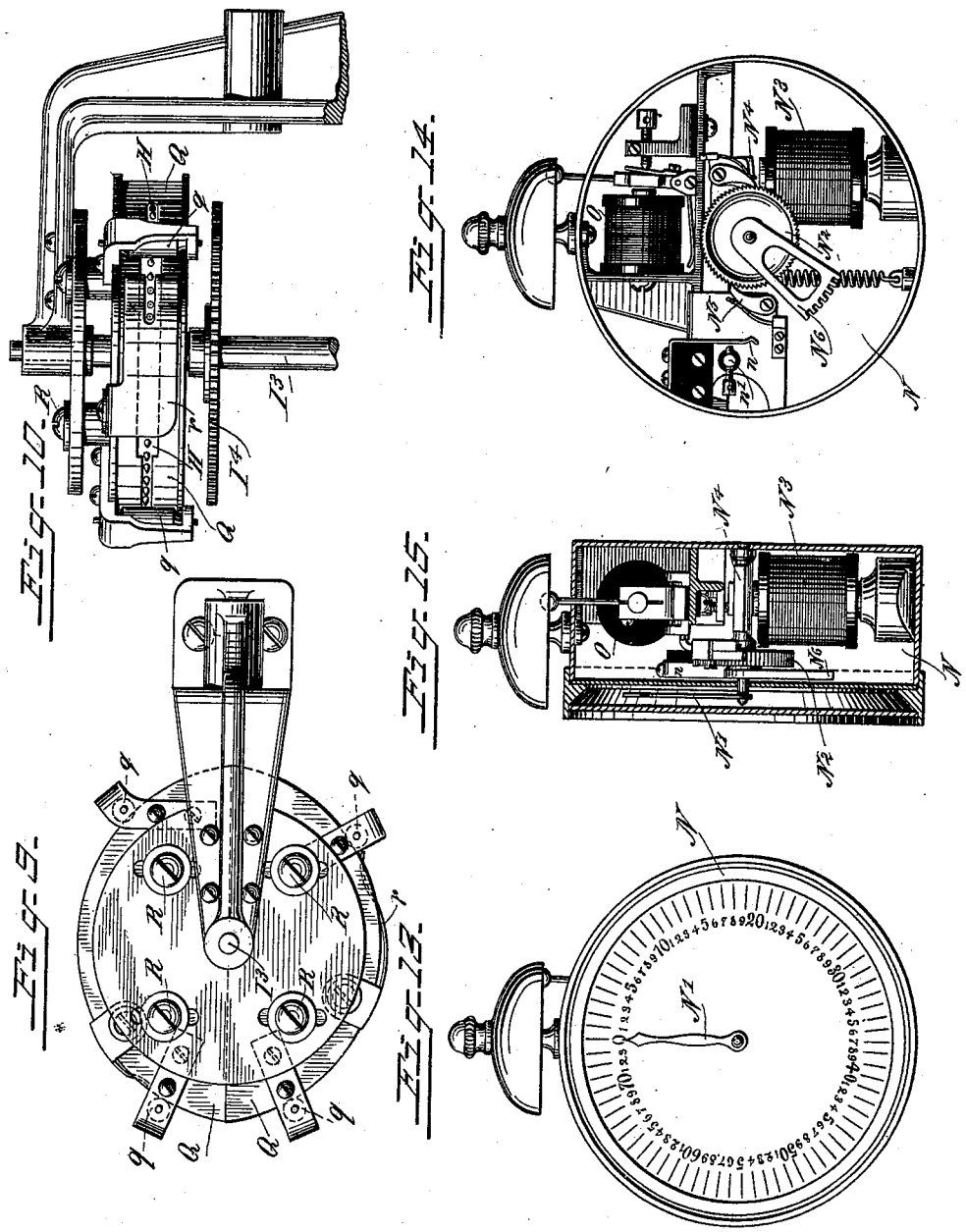
WITNESSES:
Henry T. Hirsel.
Wm H Capel
INVENTORS:
Charles L. Buckingham,
Emil Germann &
Joseph W. A. Gardam.
by H. C. Townsend
ATTORNEY.

(No Model.) 9 Sheets—Sheet 8.
C. L. BUCKINGHAM, E. GERMANN & J. W. A. GARDAM.
PERFORATOR.
No. 568,512. Patented Sept. 29, 1896.
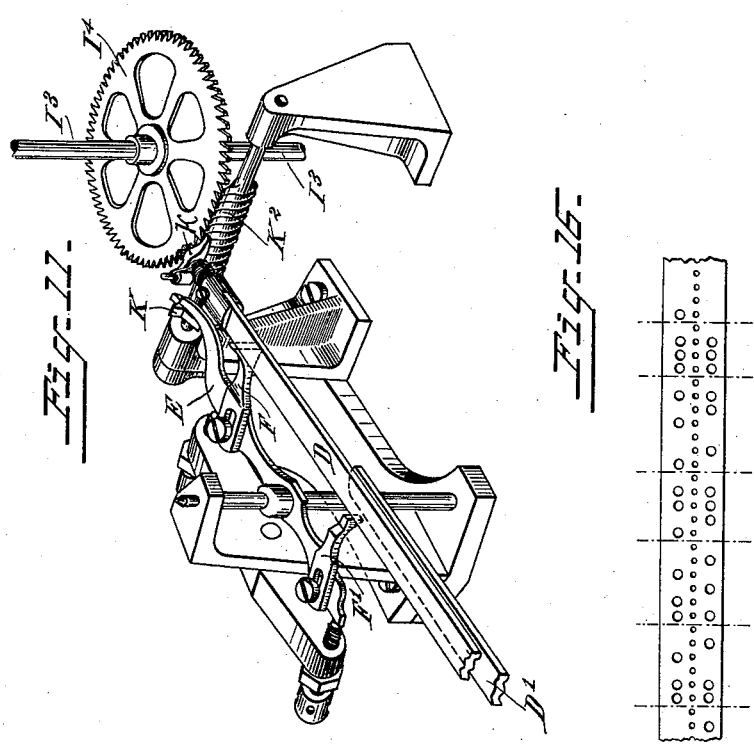
WITNESSES:
Henry T. Hirsch
Wm. A. Capel
INVENTORS:
Charles L. Buckingham,
Emil Germann &
Joseph W. A. Gardam.
by H. C. Townsend
ATTORNEY.

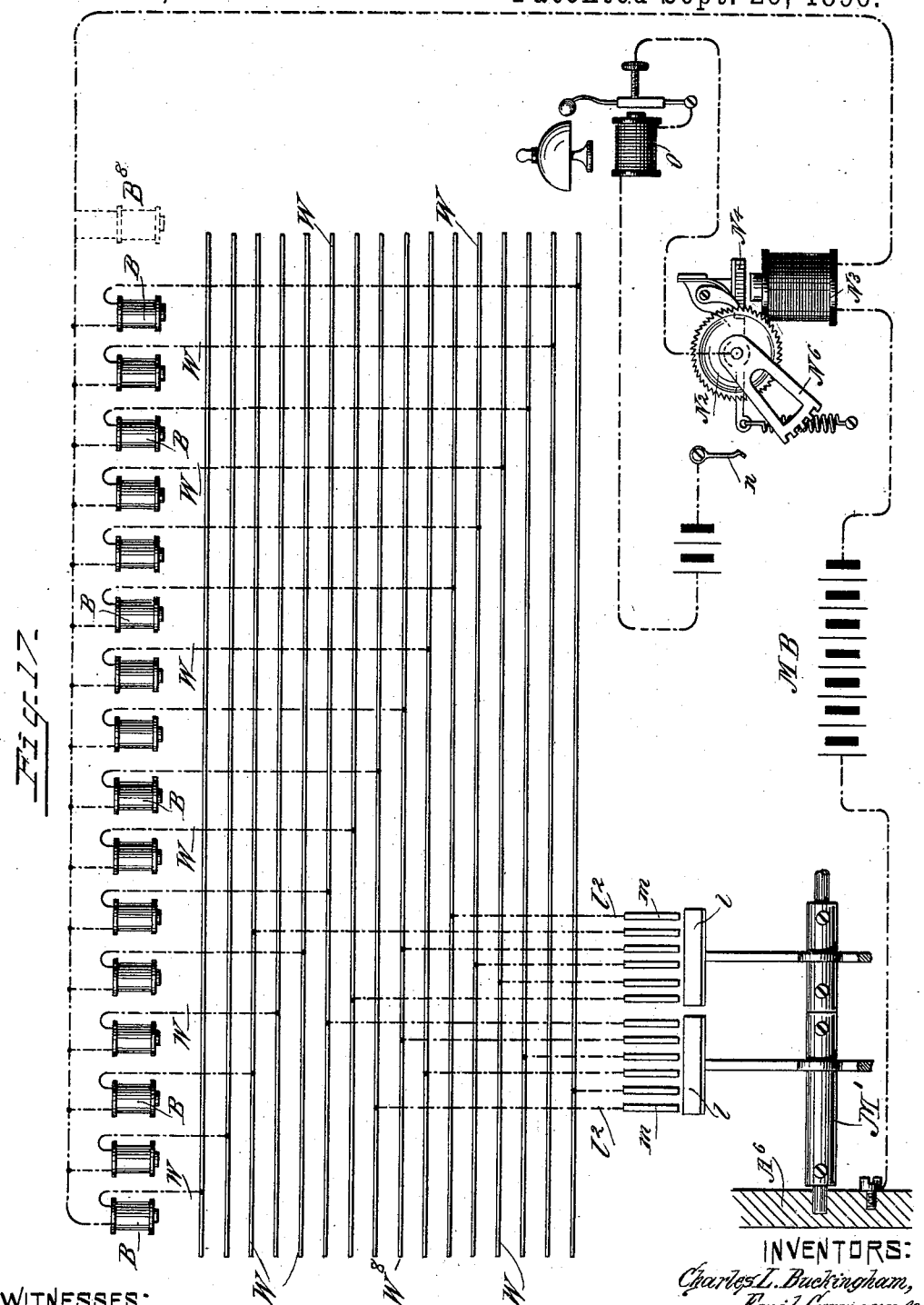

United States Patent Office.

CHARLES L. BUCKINGHAM, OF NEW YORK, AND EMIL GERMANN AND JOSEPH W. A. GARDAM, OF BROOKLYN, NEW YORK; SAID GERMANN AND GARDAM ASSIGNORS TO SAID BUCKINGHAM.

PERFORATOR.

SPECIFICATION forming part of Letters Patent No. 568,512, dated September 29, 1896.

Application filed August 13, 1895. Serial No. 559,142. (No model.)

*To all whom it may concern:*

Be it known that we, CHARLES L. BUCKINGHAM, residing at New York, in the county of New York, and EMIL GERMANN and JOSEPH W. A. GARDAM, residing at Brooklyn, in the county of Kings, State of New York, have invented a certain new and useful Perforator, of which the following is a specification.

Our invention relates to perforating-machines designed to perforate paper or other material for use in telegraph-transmitters or other apparatus.

Our invention is primarily designed for perforating a paper strip with a group of perforations the members of which are differently arranged or disposed to correspond to different letters of the alphabet and which may be run through a Wheatstone or other transmitter to control the order, sequence, or duration or interval of currents on a line, but may likewise be used for perforating strips or sheets of paper for any other purpose and in one or any greater number of rows of perforations by using a proper number of gangs of punches disposed transversely of the strip or sheet.

We have illustrated our invention as carried out in a machine organized to perforate in two rows suitable for running through a transmitter of the Wheatstone type, but have assumed in the following description that the order or arrangement of the perforations for different letters of the alphabet is somewhat varied from that used for the Wheatstone alphabet to adapt the strip for a special printing-telegraph system heretofore invented by C. L. Buckingham.

The general object of our invention is to provide an efficient and rapidly-operating perforating-machine in which the action is controlled by a series of keys or levers, one for each different group or order of perforations to be produced on the blank strip.

One part of the invention relates more particularly to the mechanism for feeding the paper strip, and is designed, primarily, as an improvement upon devices heretofore used, wherein a lever moved by the perforator mechanism, in the act of perforating a character, engages and operates the feed devices on its back movement. We use such a lever, but only as a controlling device for a positively-acting feed mechanism driven by spring or other power and in conjunction with a detent or let-off, operated and controlled as more particularly hereinafter described.

Another part of our invention relates to an organization of punches and operating-magnets therefor, together with circuit-selecting levers and circuit-closing devices for closing at one operation the circuits of said magnets in different orders or combinations, according to the group of perforations to be produced.

Our invention relates, further, to details of construction and features more particularly hereinafter described.

Figure 2:
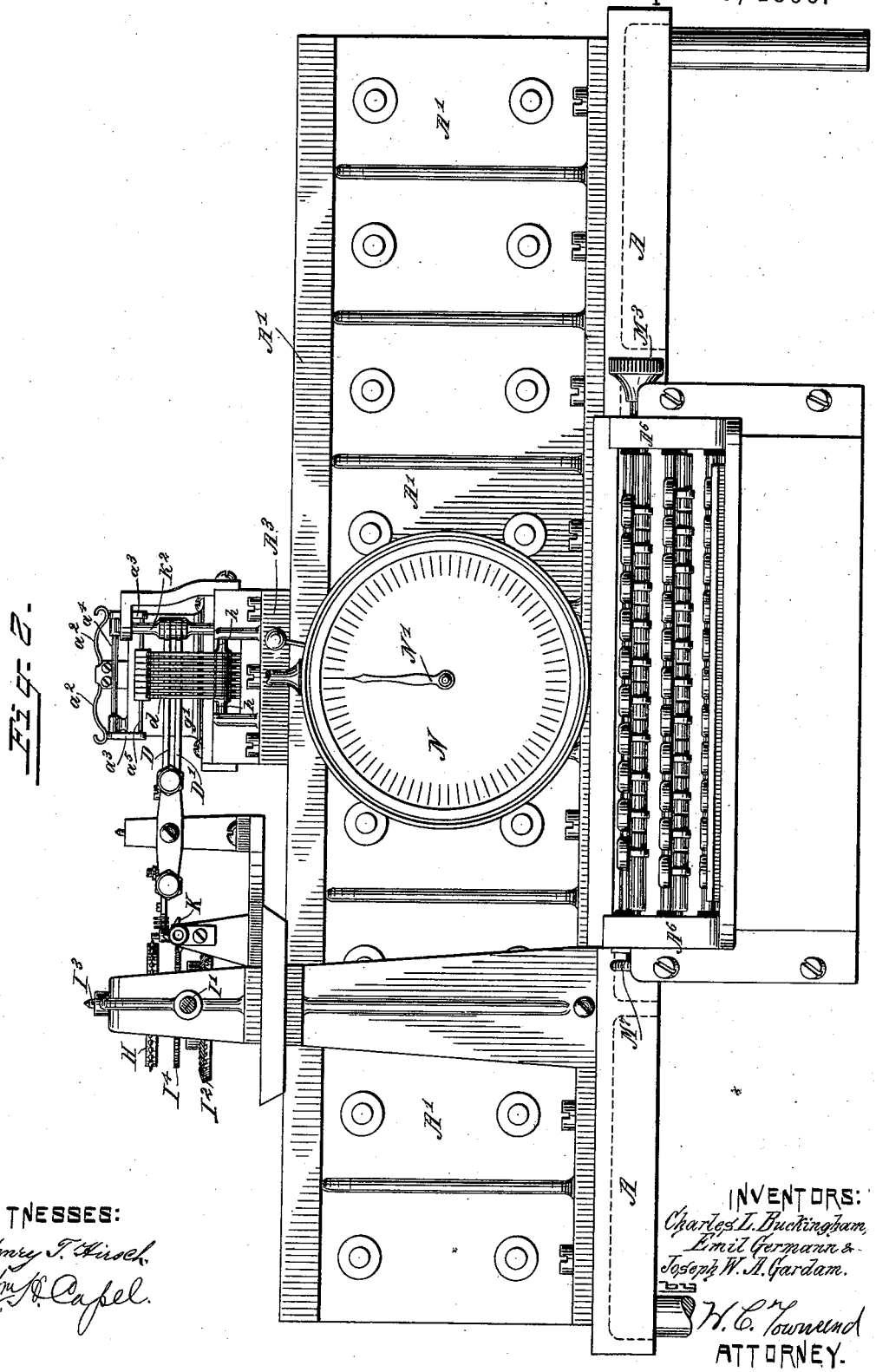
Figure 3:
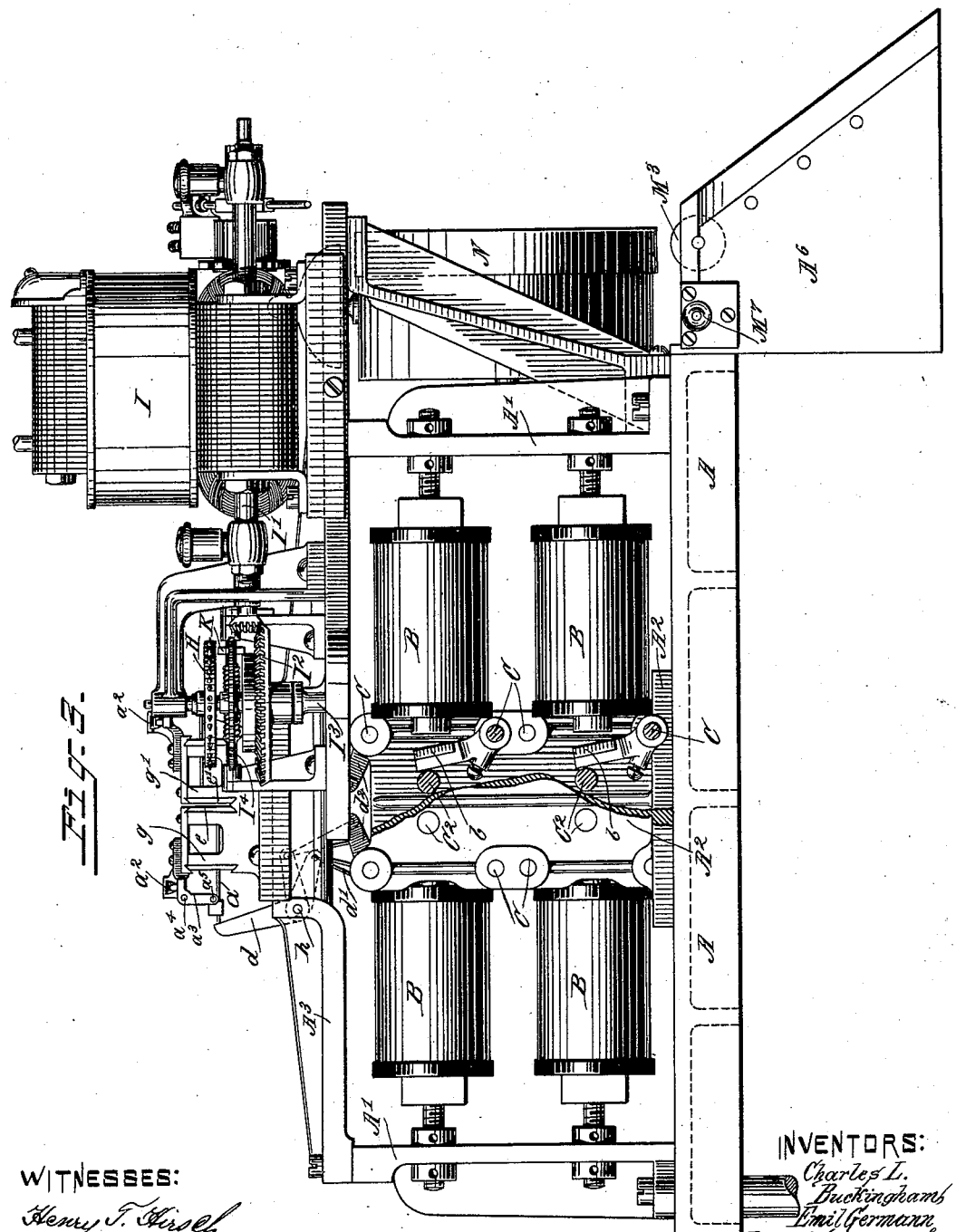

In the accompanying drawings, Figure 1 is a general plan view of the apparatus with the keyboard, indicator, and motor removed. Fig. 2 is a front elevation of the machine. Fig. 3 is a side elevation with the part of the frame carrying the key-levers removed and with a part of the standard for the rock-shafts broken away. Fig. 4 is a vertical section on the line X X of Fig. 1. Fig. 5 is a section in full size through the feed devices. Fig. 6 is a top view of the spring-box. Fig. 7 is a general plan of the keyboard or contact devices, a part of the keys being removed to avoid confusion. Fig. 8 is a vertical section on line $y\ y$, Fig. 7. Fig. 9 is a plan of the cover of the feed-wheel with the guide-rollers and guide for the paper. Fig. 10 is a side elevation of the same. Fig. 11 is a perspective view of the feed-controlling devices and associated parts. Figs. 12 and 12$^a$ are detail views showing the variable-spacing lever in end view and top view, respectively. Fig. 13 is an elevation of the dial for the indicator. Fig. 14 is an elevation of the indicator mechanism, the dial being removed. Fig. 15 is an edge view of said mechanism. Fig. 16 is a fragment of a strip perforated by the use of the apparatus. Fig. 17 is a general diagram of circuits.

A' A' indicate side plates or standards forming part of a frame upon which the working parts may be supported, and A the base of the machine.

A³ is a cross-bar or plate upon which the punches and punch-operating levers are mounted.

The punches are arranged in two rows or gangs $a\ a'$ on opposite sides of the guide-slot through which the paper to be perforated is drawn. The gang of punches $a$ is guided in a box $g$, and the gang $a'$ in a box $g'$. The two rows or gangs are arranged to work in horizontal planes, one above the other, and they respectively punch the holes at opposite sides of the central line of the tape. The die-plate for the punches $a'$ is indicated at $e'$ as fastened to the face of the guide-box $g$, while the die-plate $e$ for the row of punches $a$ is secured at the opposite side of the guide-slot on the box or frame $g'$. At their rear ends the punch-bars are engaged by the operating-levers $d$, formed as bell-crank levers and mounted on shafts $h$. These bell-crank levers are connected with the magnets and operating rock-shafts in the manner to be presently described. The punches are retracted by means of springs $a^2$, fastened to standards, as indicated in Fig. 2, and which press downwardly upon the horizontal arms of bell-cranks $a^3$, fastened to a rock-shaft $a^4$, and having their vertical arms connected by a bar $a^5$, which engages with blocks or projections upon the punch-bars. In place of these retracting devices any other suitable means may be employed for retracting the punches after they have been forced through the paper. The guide-slot for the paper is formed by the space between the die-plates $e\ e'$ and should be just wide enough to carry the strip of paper to be perforated.

The punch-operating magnets indicated by the letter B are preferably arranged in two horizontal planes, one over the other, and are secured on the inner side of the frame A', with poles projecting inwardly for operating upon the armatures $b$. In Fig. 1 the eight operating-magnets of the upper plane appear. In Figs. 3 and 4 a part of the magnets in the lower plane is shown. Sixteen magnets in all are thus provided, that being the number desired for perforating the strip according to the alphabet described in patent of C. L. Buckingham, No. 487,982, dated December 13, 1892, though it is evident that a greater or less number could be used according to the complexity in the groups of perforations which it is desired to produce at a single operation of a controlling-key or the maximum number of perforations in any group.

The several armatures $b$ are secured to arms fastened to horizontal rock-shafts C, the same in number as the magnets, and mounted in standards A² A², fastened to the base-plate. Some of the arms project upwardly from their shafts and some downwardly to bring the armatures in position, each opposite the poles of its magnet, so that by the action of the magnets some of the shafts will rock in one and some in the opposite direction. The rock-shafts all extend beneath the plate A³, upon which the punch and punch-operating levers are mounted, and are there connected with the punch-operating bell-crank levers $d$ by the links $d'$, attached to arms $d^2$, projecting from the rock-shafts C, as clearly shown in Fig. 4.

Suitable retractors (not shown) are applied to the armatures to restore them to positions of rest against the stop-bars C², running from end to end of the machine, after each operation of the punches. These retractors may be springs applied as spiral torsion-springs around the rock-shaft, or may be attached to the armatures and act under axial or longitudinal tension.

For feeding the paper forward a space corresponding to the length of the characters perforated we use the following improved means: It has been before proposed to use a feed-controlling lever operated by the punch-actuating devices, engaging with the lever at different distances from its fulcrum, so that the greater the number of punches operated or the greater the distance between the first and last punches the farther the lever will be thrown, owing to the fact that the punches nearest the end of the character are nearer the fulcrum. D indicates such a lever properly arranged to be acted upon by the levers $d$ on one side of the machine at gradually lesser distances from the fulcrum, according to the length of the character perforated, assuming that the paper is fed in the direction of the arrow, Fig. 1, and that the lever is fulcrumed on the side of the machine nearest the rearmost punch. It has heretofore been proposed to use with these levers an actuating-spring for the feed mechanism, which spring operates the lever when the lever is freed from the action of the punch-levers, and by means of a pawl attached to the lever moves the feed-wheel a variable distance according to the distance said lever has been moved in the operation of perforating a character. Instead of employing said lever as an actuating-lever for the feed mechanism we use it as a lock-controlling lever for a positively-acting feed mechanism, which is allowed to act to an extent depending upon the distance to which the end of the lever has to move backward in reaching normal or locking position under the control of or while engaged with a wheel or shaft of said mechanism. In conjunction therewith we employ a detent or releasing device for said mechanism which is operated or permitted to operate by some part of the punch-actuating devices as soon as the character is perforated. For convenience we cause the adjustable feed-lever D to operate upon this detent or releasing device to restore the same to locking position, though, as will be obvious, we might employ an independent locking device controlled by said feed-lever and alternately freed or operated by said lever as it moves away from and back to locking position.

H is a suitable feed-wheel for the paper, tape, or strip, which, as shown in Fig. 16 and as used in the art, is provided with a central line of perforations with which teeth of the wheel H may engage. Wheel H is driven by an electric motor I or other suitable power.

The larger holes, as will be seen, are arranged so that the paper may be used in a Wheatstone transmitter to produce electric pulsations of alternately-reversed polarity, some of said pulsations being prolonged. The particular arrangement of perforations shown is adapted for use with a transmitter employed for transmitting in a page-printing-telegraph system, such as described in United States patent of Charles L. Buckingham and Emil Germann, No. 544,346, dated August 13, 1895. The smaller holes form a rack to receive the teeth of a wheel, which carries the paper forward in the Wheatstone transmitter.

In preparing messages for Wheatstone transmission it is usual to perforate the paper with a central line of holes uniformly placed a part of the time in the operation of passing the paper between punch-heads to produce the larger transmitting perforations.

Our present invention consists, essentially, in preparing the strip of paper for Wheatstone transmission by first preparing it with the central row of perforations before passing it to the punch heads or devices for feeding it between the same and in next carrying it through the punch-heads and controlling its movements by means of said central row of perforations and through feed devices engaging with the same. By this method and by using suitable uniformly-acting devices to make the central row we are enabled to produce a row of greater uniformity than can be produced by the old method, and at the same time to furnish means whereby the feed of the paper between the punch-heads may be governed with great uniformity and exactness, being at all times under the positive control of the feed-wheel, which is positively connected to the tape through engagement of its teeth or pins with the holes making up the central line.

I' is a horizontal shaft of said motor, which shaft carries a bevel-wheel engaging with the bevel gear-wheel $I^2$. The latter is loose upon the vertical shaft $I^3$, which latter turns in suitable bearings, as indicated in Fig. 5, and has secured to it the worm-wheel $I^4$, as well as feed-wheel H. The wheel $I^2$ is connected to the shaft through a spiral spring $I^5$, one end of which is attached to shaft $I^3$ and the other to the barrel $I^6$, secured to or forming part of wheel $I^2$. By means of the motive power the spring $I^5$ is kept wound up and imparts a constant torque to the shaft. By using the spring in this manner we avoid the difficulties which would ensue from the inertia of the prime mover itself if it were attached or connected directly with the driving-wheel. This difficulty arises from the fact that the paper-feeding devices move intermittently and require to stop and start with great promptness.

K is a detent-wheel connected with the feed mechanism. For this purpose it is conveniently fastened upon the screw-shaft $K^2$, the screw upon which gears with wheel $I^4$, formed as a worm-wheel. The feed-wheel is released and stopped by means of the detent-lever E, an arm of which is arranged to be brought into and out of position to be engaged by the teeth of wheel K.

The detent-lever E carries two arms F F'. The arm F' is engaged by a lever D', which is under the control of the punch-actuating devices and operates on said arm to move the lever in a direction to free the wheel K. The arm F is engaged by lever D in a manner to cause the detent-lever to engage the wheel K.

The feed-controlling lever carries at one end a spring catch or pawl $k$, which can move freely over the screw on shaft $K^2$ when the lever D is moved forward by the punch-actuating levers $d$ in the operation of perforating the paper, but will engage with the groove of the screw-shaft $K^2$, so that the lever D can only return to normal position as the shaft rotates. The catch on the end of lever D consists of a pin $k^4$, mounted on the spring-actuated lever $h^5$, which is pivoted on the end of D, as shown in Figs. 12 and $12^a$. When the lever D is moved by the punch-actuating levers, the pin slides over the threads of the screw-shaft as it is pulled by the lever, but when pushed by the lever on the reverse movement of the latter the pin is forced into the thread and so travels as a nut upon the rotating shaft. The lever D is pivoted on a post at $k^2$, and is there furnished with a suitable spring (not shown here) tending to move it in a direction to engage with the arm F of the detent-lever E. The lever D' operates as a means of releasing the feed mechanism as soon as a character is perforated. It may also be pivoted on post $k^2$ and be provided with a spring tending to throw it in a direction to engage with the arm F' of the detent-lever E.

When the punches are operated by the levers $d$, the lever D' is thrown forward by one or more of the levers $d$; but as soon as the levers $d$ are returned to normal position the lever D, being carried back by its actuating-spring, engages the arm F', and thereby releases the wheel K. Normally these parts stand in the position indicated in Fig. 1. Both levers D and D' are engaged with the arms of the detent-lever E, and the latter is held in locking position, owing to the superior power of lever D. When the punch-operating levers $d$ move forward, both levers D and D' are operated and move forward away from engagement with arms F F' of the detent-lever, which latter therefore retains its locking position, though it is freed from the influence of lever D. When the latter starts to return from its extreme forward position, the pawl upon the end of D becomes engaged with the screw on shaft K², and the lever can therefore only return to normal position as the shaft rotates; but this rotation cannot begin to take place until the lever D' is restored to normal position and unlocks the wheel K. This unlocking takes place immediately upon the restoration of the punch-actuating levers *d* to normal position, since then the lever D', under the influence of its spring, may fly back and strike the arm F'. As soon as this takes place the arm D begins to move backward and the feed-wheel to rotate, until, finally, the arm F of the detent-lever is engaged by D and the wheel is locked. In this action it is obvious that the lever D' will yield slightly, owing to the superior power of D, and allow the detent-lever E to swing back into position to lock the wheel K.

We do not limit ourselves to any particular construction of locking or detent device for the feed mechanism or to operating the same from any particular portion of the punch actuating or controlling devices, the gist of our invention in this respect consisting in the combination of the variable-space lever with a positively-acting feed-power, the power itself being released automatically in the act of punching a character or any combination of perforations, preferably on the back-throw of the punch-actuating levers, and being automatically stopped when the variable-space lever completes its backward travel under the control of said power.

The operation of the magnets for the purpose of perforating the strip with a set of holes in any desired order or combination is controlled by a set of circuit-controlling keys L, each of which when depressed closes the circuits of the proper magnets. When the paper is to be perforated after the principle of the alphabet described in the above-named patent of C. L. Buckingham and for use in a Wheatstone transmitter, each letter is represented in the tape by six perforations arranged in a certain spacing and order on opposite sides of the tape, as indicated in Fig. 16, showing a fragment of tape for the purpose of producing six alternations of current on the line, one or more of which is prolonged. For some forms of receiving apparatus the final pulsation is always prolonged, and each set of perforations in the same divisions of the section of tape represented is so arranged as to produce that result. Each key-lever L accordingly closes the circuit of six magnets proper for making perforations differently disposed for each key, and is for that purpose provided in its end with a transverse contact-piece *l*, which engages with a group of six yielding contacts *m*, formed as pivoted plates which turn on an insulating bar or rod M, mounted in plates A⁶, projecting from the front of the base-plate. Three such bars are provided for three ranges of contacts *m*, corresponding to three ranges of keys L, a part only of which are shown in the drawings as mounted and turning upon rods M'.

The contacts *m* of each set of six are insulated from one another and from other sets by interposing insulating-washers between them and mounting them to turn on a sleeve of insulating material which surrounds each bar M. The contacts *m* are connected with the magnet-circuits through springs *l'*, against which they rub at their rear ends when they yield under the action of the key-levers L. As each contact-plate *m* is mounted to move and yield independently of the others, connection of the piece *l* with all the plates *m* of the corresponding set is insured. Each spring *l'* is grooved at the upper end to receive the rubbing portion of plate *m* and presses against the edge of the plate, which is formed, as shown, at the point of engagement in such way that the spring tends to restore the plate to normal position as well as to give it a slight resistance to the lifting action of the key-lever L, thereby forming good connection between *l* and *m*.

Each spring *l'* is mounted in a bar M² of insulating material, being fastened in a hole in said bar in contact with a connecting-wire $l^2$ by means of a wedge-pin $l^3$. The wires $l^2$ lead, respectively, to the circuits of the proper punch-magnets, while the frame carrying the key-levers is connected to the other pole of the circuit, as indicated in the diagram Fig. 17, where M B indicate any suitable source of electricity for energizing the magnets. The several magnets connect with a common return in the ordinary way. In this diagram bus-bars or wires W are indicated, corresponding in number to the sixteen magnets, and each magnet is connected to one of said bus-bars.

The wires $l^2$ for each group of contacts are led to the proper bus-bars, corresponding to the magnets and punches, which correspond to the key of that group, and which it is necessary to operate in order to give the desired grouping of perforations in the tape. One contact of each group is connected to a certain bus-bar, as in the diagram that indicated at W⁸, so that a certain magnet, B, is thrown into circuit by each key. It is therefore obvious that this magnet might be placed in the common return of all the others, as indicated in dotted lines at B⁸, then dispensing with one of the contacts of each key-lever and the bus-bar common thereto. It is obvious that any other alphabet or system of grouping of perforations for any purpose may be produced by properly combining the connections, and that also a greater or less number of perforations in each group may be produced by using a greater or less number of contacts for each selecting-lever.

For the purpose of turning up the contact end of the several ranges of contacts *m* so that they may be readily got at for cleaning we may use the following mechanism: Secured to the upper rod M is a knob M³ on the outside of the frame A⁶, and fastened to said rod at opposite ends of the same are the crossbars or yokes M⁴. Connecting the latter beneath the upper range of contacts is a bar M⁵ of insulating material, forming a seat or rest for the contacts $m$. As will be obvious, by turning the knob M³ all the upper range of contacts may be swung so that the under side of the outer ends, where the selecting-keys engage, will be exposed for cleaning. On turning the knob back the contacts are swung down to normal position by the positive action of a rod M⁶, extending across the keyboard above the upper range of contacts and supported at its opposite ends by arms $m^6$, pivotally connected with the yokes M⁴. The other ranges of contacts are operated in the same manner, the cross-bars or yokes M⁴ for said ranges being connected to the upper pair by a rod $m^5$, so that all will be operated together. The cross-bars or yokes M⁴ of the second and third range may be fastened to the rods M, or may be sleeved upon them.

L² is a supplemental key-lever used as a space-key in conjunction with contacts controlling punch-magnets to produce a group of perforations whereby five short pulses alternating in polarity followed by a long pulse may be produced, such a set of pulsations being that whereby in a certain form of printing-telegraph receiver a complete sequence of actions is produced without moving the type-wheel from zero position, but causes a feed of the paper one step. The final long pulse is a synchronizing pulse. A group of perforations proper for making a space is shown at the right-hand end of the fragment of perforated tape, Fig. 16. If desired, this space-key might in some uses of the machine be caused to produce a feed of the paper without any operation of a punch by the use of a supernumerary magnet, whose circuit should be closed by said space-key and which would operate upon a supernumerary bell-crank lever $d$, operating simply to move the levers D D', and thereby effect a feed of the paper, or the spacing might be produced in any other desired manner for a perforated blank or strip employed in other apparatus beside telegraph apparatus.

The shafts M and connected mechanism for turning up the contacts are normally locked by a pin $m^7$, having an operating-knob M⁷ (broken away in Fig. 7, but shown in Figs. 2 and 3) and mounted in one of the side frames A⁶ in position to engage with a hole in one of the yokes M⁴.

For guiding the perforated paper while engaged with the toothed feed-wheel we prefer to employ the device shown in Figs. 9 and 10, which is omitted from the other figures in order to better show the other portions of the apparatus. In Figs. 9 and 10 the guide-rolls between which the paper passes are indicated by $q$. These rolls are mounted on a shell or case Q, which encircles the toothed feed-wheel H and is mounted on the frame of the feed mechanism, as shown. The shell or case is made with a double wall at its sides to make a guide tube or passage for the paper strip around the wheel, as indicated at $r$, said tube having a slot in its inner wall or side next the wheel H to permit the entrance of the teeth on wheel H for the purpose of engaging the central line of feed perforations in said tape. By adjusting the tape guide or shell in a radial direction to or from the periphery of the wheel a convenient adjustment of the space between the feeding-teeth to the space between the feeding perforations of the paper strip may be provided, since, as will be obvious, the mean distance of the teeth from one another is greatest nearest their ends, and if the paper should buckle slightly between perforations, owing to the distance between perforations being greater than the distance between the teeth at the point where they take hold of the paper, the difficulty would be avoided by moving the paper radially outward, so that the teeth will take hold nearer their ends. This relative adjustment of the space between teeth to the space between feeding perforations is conveniently made by constructing the shell in two parts, one or both of which are radially adjustable by means of screws R, as shown, according as the paper is fed in engagement with one or both sides of the wheel H.

N is an indicator for use when the perforated tape is to be employed for sending a message that is to be printed or recorded in page form upon a blank, which is, for instance, made up in the form of a cylinder and is divided on the line of the margin of the printed page when it is removed from the receiving instrument.

In a form of receiver described in application of C. L. Buckingham, filed April 16, 1894, Serial No. 507,673, the letters are printed in lines around the tubular blank and the tube is fed circumferentially a long space or step across the margin of the printed page from the end of one forward to the beginning of the next line. In the machine as organized the feed takes place after a predetermined number of letter and word space feeds have been made in the machine, and in perforating the tape it is desirable that the operator should know when he has perforated enough matter to nearly fill a line in order that he may properly space the perforated message to effect a proper spacing at the end of each line in the message as received.

The dial of the indicator N is graduated to the number of letters and feed spaces comprised in a full line of matter as printed by the receiver. The indicator shown is graduated to seventy-four letters and spaces, as shown in Fig. 13, and has a pointer N', which moves over the scale step by step, one step for each letter or space perforated. For this purpose the pointer N' is secured to a shaft which carries a ratchet-wheel N², having seventy-four teeth and operated step by step by an electromagnet N³, whose armature N⁴, pivoted to swing on the shaft, carries a pawl engaging with the ratchet-teeth of wheel N². The magnet N³ is energized in any suitable manner each time a letter or space of the perforator is operated. For convenience we place it in a common return-circuit of the punch-operating magnets indicated in the diagram.

At N⁵ is a retaining-pawl.

N⁶ is an arm secured to the shaft so as to revolve with the pointer N', and having a series of projections on its segmental end adapted to engage with a circuit-closing spring $n$ and press the same into contact with the contact $n'$ as the pointer nears the end of its revolution. By this means the circuit of a tap-bell magnet O or other signal is intermittently closed to give warning to the operator when he approaches the limit of perforated matter sufficient to produce a complete line in the receiver.

The magnet O may be in a local circuit, as indicated in the diagram, or may be operated in any other circuit or branch of circuit, as desired.

What we claim as our invention is—

1. In a perforator, the combination of the power-driven feed mechanism, a variable-feed lever engaging with said mechanism on the reverse movement of said lever, means for locking said mechanism on the completion of the said reverse movement, and an automatic releasing device operating independently of the variable-feed lever to release said mechanism at each operation of the perforating mechanism.

2. The combination with the punch-actuating devices and the feed mechanism, of a locking lever or detent for said mechanism and two actuators for said lever or detent one to lock and the other to unlock the same, both actuators being moved by the forward movement of the punch-actuating devices, the former thereby unlocking said mechanism and returning to locking position with a delayed movement independently of the punch-actuating devices and the latter mounted and constructed to return immediately with the said actuating devices, after the perforating action, and to effect the release of the feed mechanism.

3. In a perforator, the combination with the feed mechanism, of a detent therefor, actuators for said detent moving the same in opposite directions, a series of punch-actuating levers engaging directly with said actuators, and a spring dog or pawl carried by the actuator which moves the detent into locking position, said dog engaging and traveling with the feed mechanism on the reverse movement of the actuator carrying it, as and for the purpose described.

4. In a perforator, the combination, substantially as described, with the punch-actuators, of the feed mechanism and driving power therefor, a detent for locking said mechanism, a lever for throwing said detent into action on the return movement and moved forward by the punch-actuators which engage it at different distances from its fulcrum, a pawl carried by said lever and engaging with the feed mechanism only on the return movement of the lever, and means under control of the punch-actuating devices for operating the detent to release the feed mechanism after each perforating operation.

5. In a perforator, the combination with the punch-actuators and the feed mechanism, of a screw-shaft geared to the latter, and a variable-feed lever moved forward by said actuators and on its return engaging with said screw-shaft, as and for the purpose described.

6. In a perforator, the combination with the feed mechanism, of a screw-shaft geared thereto and carrying a detent-wheel, a detent, a variable-space lever adapted to operate said detent on the completion of its return movement, and means for connecting the lever with the screw-shaft whereby its return movement may take place under the control of the feed mechanism.

7. The combination in a perforator, of punch-actuating devices, a feed mechanism, a detent-lever, and two actuators engaging with the latter to move it in the opposite directions and themselves moved by the punch-actuating devices, one of said actuators for the detent-lever being superior in power to the other, as and for the purpose described.

8. The combination in a perforator, of a feed mechanism, a detent therefor, two levers actuating the detent in opposite directions, a retarding device forming a part of said mechanism, one of said levers being provided with means for connecting it with the retarding device whereby it may complete its return movement under control of the feed mechanism while the other lever is adapted to return freely to position for unlocking the detent, and punch-actuating devices operating on said levers, as and for the purpose described.

9. The combination in a perforator, of a feed mechanism, a detent-lever E, a pair of actuating-levers D, D', engaging with the lever E, at opposite sides of its fulcrum, a pin carried by the lever D, and adapted to engage with a member of the feed-wheel train, and a punch-actuating mechanism operating on both of said levers on the forward movement of the punches.

10. The combination in a perforator, of a feed-wheel, a strip of paper engaged thereby, a series of punches, a spring for turning the said feed-wheel, a motor having a constant torque for keeping said spring under tension, a detent for controlling the movement of the said feed-wheel, and means for operating the detent to free the wheel after each action of the punches and to restore it to locking position after a predetermined feed movement.

11. In a perforator, the combination with the paper-feed mechanism and the perforated paper strip engaged by pins or teeth in the feed-wheel, of a detent controlling the movement of the feed-wheel, a spring actuating said wheel, and a motor having a constant torque for keeping said spring under tension.

12. The combination in a perforator, of a feed mechanism, a screw-shaft geared therewith, a detent-wheel upon said shaft, a detent carried by a lever, a lever D, engaging with one arm of said detent-lever and provided with means for connecting it to the screw-shaft so that it may move under the control of the same, a lever D', engaging with the other arm of said detent-lever, and a series of punch-actuating levers operating upon the levers D, D'.

13. In a perforator, the combination substantially as described, of two gangs of punches working in boxes on opposite sides of the paper, a series of rock-shafts, a series of magnets operating on said rock-shafts, and means connecting said shafts and punches, as and for the purpose described.

14. The combination in a perforator, of two gangs of punches arranged to perforate a paper strip on opposite sides of the central line and mounted in boxes or guides opposite one another, a series of bell-crank-actuating levers engaging with the punches, a series of rock-shafts linked to said actuating-levers, and a series of magnets operating on the rock-shafts.

15. In a perforator, the combination substantially as described, of the two ranges of actuating-magnets mounted one above the other, a series of parallel rock-shafts mounted between the same and each carrying an armature for one of the magnets, two gangs or series of punches mounted opposite one another in the frame over the magnets, bell-crank-actuating levers therefor, and connecting-links connecting the same with the rock-shafts.

16. In an electromagnetic perforator, a range of yielding contact-plates mounted to turn on a suitable support and insulated from one another, in combination with pressure-springs constantly engaging with the edge of said plates and insulated from one another, and contact-bars adapted to engage with a number of said plates simultaneously.

17. The combination with the pivoted contact-plates $m$, of the grooved connection-springs $l'$, in continuous electric contact with the edge thereof.

18. In an electromagnetic perforator, the combination with selecting-keys, of pivoted contact-plates mounted to turn on a suitable support, connecting-springs engaging with the edge of said plates, and a supporting insulating-bar in which said springs are secured in contact with circuit-wires.

19. The combination substantially as described with the yielding electric contacts and a series of contact-keys engaging with different groups of said contacts, of a transverse lifting-bar common to the same for raising all of said contacts for cleaning.

20. The combination substantially as described with the two or more ranges of pivoted electric contacts, of a series of connected contact-lifting bars arranged between said pivoted contacts whereby all the contacts may be elevated together for cleaning.

21. The combination with the yielding contacts $m$, and the circuit-closing keys adapted to engage and make electric contact with a group of the same, of rubbing contact-springs pressing against the edge of the contact-plates and aiding to restore the same to normal position.

22. The combination with the ranges of pivoted contacts, of lifting-bars running under each range, and a restoring-bar running over the range and connected with said lifting-bar whereby when the latter is restored to normal position the upper bar may positively move the contacts back to normal position.

23. The combination with the ranges of contact-plates, of a lifting-bar for each range, an operating-knob connected to the bar of one range, and a link $m^5$, connecting the latter with the bars for other ranges.

24. The combination with a perforator, of a step-by-step indicator having an operating-magnet energized once at the operation of the perforator for each letter or space, an electric alarm, and means secured to the shaft of the indicator for closing the circuit of the alarm after a certain number of letters and spaces have been produced.

25. The combination with the perforated paper and the toothed feed-wheel engaging therewith, of means for adjusting the paper and wheel relatively to one another on a radial line.

26. The combination with the toothed feed-wheel, of the paper guiding and supporting shell adjustable radially to and from said wheel.

Signed at New York, in the county of New York and State of New York, this 17th day of June, A. D. 1895.

CHARLES L. BUCKINGHAM.
EMIL GERMANN.
JOSEPH W. A. GARDAM.

Witnesses:
WM. H. CAPEL,
HENRY T. HIRSCH.